United States Patent
Belingheri et al.

(10) Patent No.: US 11,217,214 B2
(45) Date of Patent: Jan. 4, 2022

(54) MODULAR CONTROL DEVICE

(71) Applicant: SPECIALWAVES S.R.L., Albano Sant'Alessandro (IT)

(72) Inventors: Riccardo Belingheri, Pregnana Milanese (IT); Diego Vassalli, Brembate di Sopra (IT); Livio Maffioletti, Seriate (IT); Massimiliano Moioli, Lovere (IT)

(73) Assignee: SPECIALWAVES S.R.L., Albano Sant'Alessandro (IT)

( * ) Notice: Subject to any disclaimer, the term of this patent is extended or adjusted under 35 U.S.C. 154(b) by 91 days.

(21) Appl. No.: 16/613,559

(22) PCT Filed: May 23, 2018

(86) PCT No.: PCT/IB2018/053647
§ 371 (c)(1),
(2) Date: Nov. 14, 2019

(87) PCT Pub. No.: WO2018/215944
PCT Pub. Date: Nov. 29, 2018

(65) Prior Publication Data
US 2021/0166665 A1 Jun. 3, 2021

(30) Foreign Application Priority Data
May 23, 2017 (IT) .................. 102017000055625

(51) Int. Cl.
*G10H 1/00* (2006.01)
*G10H 1/34* (2006.01)
*G05B 19/08* (2006.01)

(52) U.S. Cl.
CPC .......... *G10H 1/0008* (2013.01); *G05B 19/08* (2013.01); *G10H 1/0066* (2013.01); *G10H 1/344* (2013.01);
(Continued)

(58) Field of Classification Search
CPC .... G10H 1/0008; G10H 1/0066; G10H 1/344; G10H 2220/295; G05B 19/08; G05B 2219/2615
(Continued)

(56) References Cited

U.S. PATENT DOCUMENTS

| 2,963,626 A | * | 12/1960 | Val, Jr. | .................. G05B 19/08 |
| | | | | 361/805 |
| 6,875,913 B2 | * | 4/2005 | Bubar | .................... G10H 1/344 |
| | | | | 84/423 R |

(Continued)

FOREIGN PATENT DOCUMENTS

DE 102004010965 A1 9/2005

OTHER PUBLICATIONS

Specialwaves, Mine-Modular Controller, Jan. 31, 2017, Kickstarter, https://web.archive.org/web/20170130105859/https://www.kickstarter.com/projects/345524876/mine-modular-controller (Year: 2017).*

(Continued)

*Primary Examiner* — Christina M Schreiber
(74) *Attorney, Agent, or Firm* — Arent Fox LLP; Michael Fainberg

(57) ABSTRACT

A modular control device for controlling a device, a process or an application, comprises a plurality of control modules, a module housing base, comprising an electronic motherboard where a plurality of electrical base contact groups is formed, arranged as an array, each electrical base contact group implementing an electrical connection with the electrical module contacts, and an electronic output interface operatively connected to the base. Each control module is provided with releasable coupling means adapted to allow quick fitting and release of each control module on and off the base. The motherboard is configured to bring electrical power to each control module fitted on the base, recognize (Continued)

placement and orientation of each module fitted on the base, and transmit to the electronic output interface electrical control signals generated by the control modules. The electronic output interface converts electrical control signals into electrical output signals compatible with the device, process or application to be controlled.

17 Claims, 11 Drawing Sheets

(52) U.S. Cl.
CPC ............... *G05B 2219/2615* (2013.01); *G10H 2220/295* (2013.01)

(58) Field of Classification Search
USPC .......................................................... 84/601
See application file for complete search history.

(56) References Cited

U.S. PATENT DOCUMENTS

| | | | | |
|---|---|---|---|---|
| 7,608,776 | B2 * | 10/2009 | Ludwig | G10H 1/32 84/721 |
| 7,732,702 | B2 * | 6/2010 | Ludwig | G10H 1/348 84/644 |
| 7,786,371 | B1 * | 8/2010 | Moates | G10H 1/368 84/645 |
| 7,977,561 | B2 * | 7/2011 | Folkesson | G10H 1/34 84/615 |
| 9,633,639 | B2 * | 4/2017 | Lee | G10H 1/0091 |
| 9,967,044 | B1 * | 5/2018 | Gray | G10H 1/0066 |
| 10,127,899 | B2 * | 11/2018 | Perez | G10H 1/0058 |
| D843,988 | S * | 3/2019 | Belingheri | D14/238.1 |
| 10,446,129 | B2 * | 10/2019 | Garncarz | G10H 1/0058 |
| 2009/0301289 | A1 * | 12/2009 | Gynes | G10H 1/0066 84/645 |
| 2010/0064883 | A1 * | 3/2010 | Gynes | G10H 1/32 84/645 |
| 2010/0147139 | A1 * | 6/2010 | Negoescu | G10H 7/006 84/743 |
| 2014/0260908 | A1 * | 9/2014 | Yoshikawa | G10H 1/32 84/609 |
| 2016/0219740 | A1 * | 7/2016 | Gehrke | H05K 7/026 |
| 2019/0122648 | A1 * | 4/2019 | Garncarz | G10H 1/0066 |
| 2021/0166665 | A1 * | 6/2021 | Belingheri | G10H 1/344 |

OTHER PUBLICATIONS

Rounik Sethi, This Modular MIDI COntroller, Specialwaves Mine, Is Smart, Customisable & Sexy, Nov. 26, 2016, Ask Audio, https://ask.audio/articles/this-modular-midi-controller-specialwaves-mine-is-smart-customisable-sexy (Year: 2016).*

International Search Report, issued in PCT/IB2018/053647, dated Sep. 20, 2018, Rijswijk, Netherlands.

Rounik Sethi, "Specialwaves Mine Is The Lego Of Modular MIDI Controllers", Ask Audio—A non linear Educating Company, Nov. 26, 2016 (Nov. 26, 2016), pp. 1-7, retrieved from the Internet: https://ask.audio/articles/this-modular-midi-controller-specialwaves-mine-is-smart-customisable-sexy, XP055448036.

Rounik Sethi, "Specialwaves Mine Is The Lego Of Modular MIDI Controllers: Screenshots of embedded Vimeo Video", Ask Audio—A non linear Educating Company, Nov. 26, 2016 (Nov. 26, 2016), pp. 1-6, https://ask.audio/articles/this-modular-midi-controller-specialwaves-mine-is-smart-customisable-sexy, retrieved from the Internet: https://vimeo.com/190926471, XP055448038.

\* cited by examiner

| PARAMETER | NOTES | ASSIGNMENT | USED BY | EXAMPLES |
|---|---|---|---|---|
| Module type | | In production | Removable unit and module | Potentiometer, Encoder etc. |
| Unique identifier (GUID) | Generated randomly | In production | Removable unit | |
| Setup | Parameters used for the basic operation of the control | In production | Module | Sensitivity of a potentiometer |
| Position and orientation | | From the control device after identification | Removable unit | Slider in row 3, column 6 position and vertical orientation from top to bottom |
| Label | Label assigned to the module | With the configurator | Configurator | |
| Color | Color assigned to the module | With the configurator | Configurator | |
| Event-Message | Value that is maintained in the base or in the module | With the configurator | Removable unit | Note, Control change (ce) |
| Event-Macro | Value that is maintained in the base or in the module | With the configurator | Removable unit | Macro to define the response curve of the potentiometer |
| Property | Generic values that are used in the Control Device scripts | From the control device during use | Removable unit and module | LED color of a button |
| Default property value | Generic values that are used in the Control Device scripts | With the configurator | Removable unit and module | LED color of a button |

FIG.7

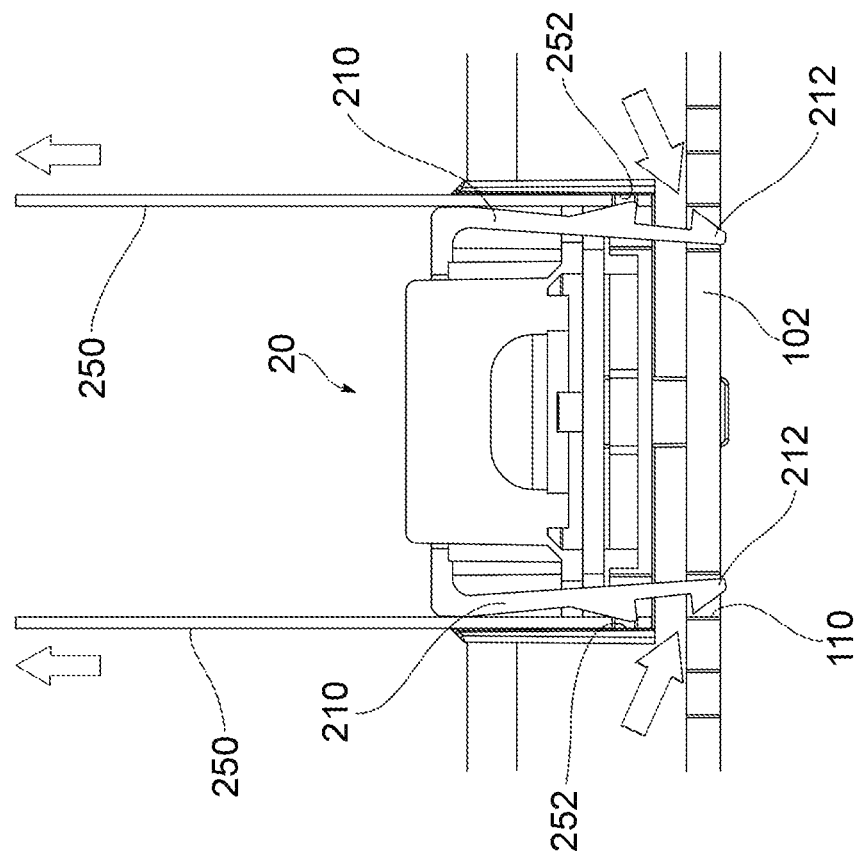
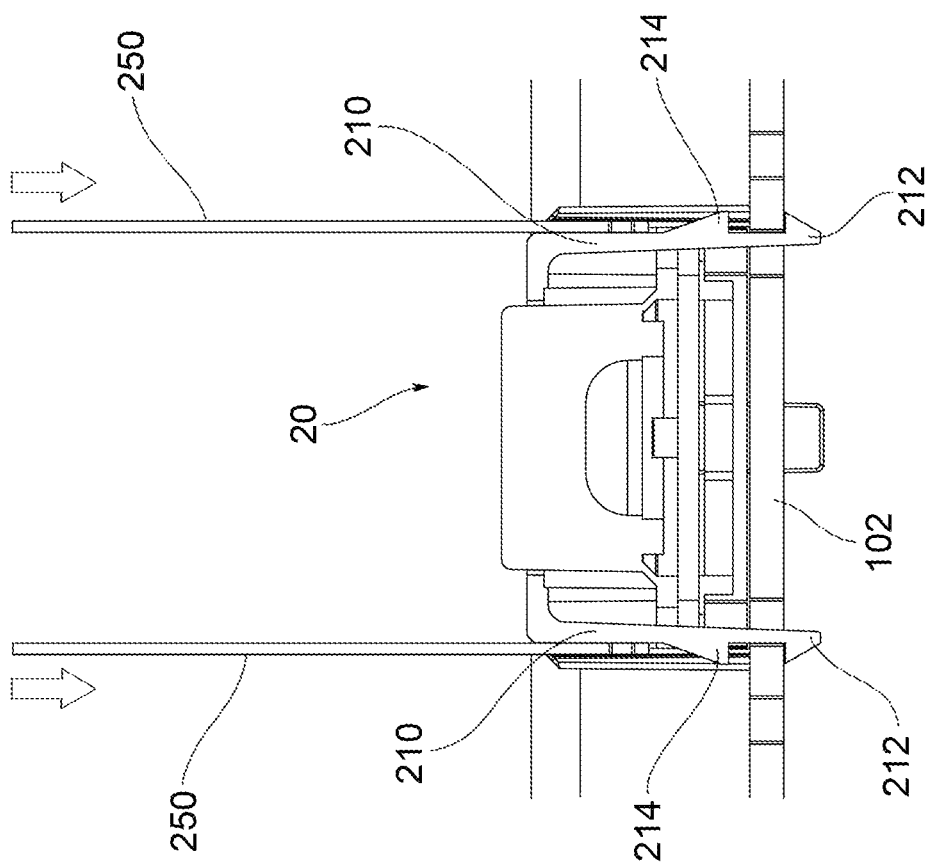

MODULAR CONTROL DEVICE

CROSS-REFERENCE TO RELATED APPLICATIONS

This application is a National Phase Application of PCT International Application No. PCT/I132018/053647, having an International Filing Date of May 23, 2018 which claims priority to Italian Application No. 102017000055625 filed May 23, 2017, each of which is hereby incorporated by reference in its entirety.

FIELD OF THE INVENTION

The present invention relates to a modular control device for controlling a device, a process or an application. In particular, the control device according to the invention finds application in all those sectors in which a flexible human-machine interaction is required to control a process, an application or a device by a user.

BACKGROUND OF THE INVENTION

The advent of the computer marked a turning point in human-machine interaction, so much so that it became an almost indispensable tool in every professional and non-professional activity. The devices most often used to allow the user to interface with the computer are definitely keyboard and mouse; in some sectors, however, these devices are very limited and do not allow optimal use of some software. For this reason, other interfaces were created, such as graphical tablets to draw directly on Personal Computers without using paper, gaming mice and joysticks, 3D modeling trackballs, midi controllers to manage music software, etc.

However, these products are very static and cannot adapt to the needs of the most demanding users. The introduction of tablets and multi-touch devices in general has allowed users to take advantage of a new powerful interface capable of simulating virtual controls such as buttons, knobs, sliders and above all of being able to arrange them as desired within the tactile area available.

However, for many applications, users still prefer to use physical controls because touchscreen technology does not ensure the right accuracy and tactile sensitivity.

So, what is currently missing is a flexible physical device that can be adapted to the user's needs.

SUMMARY OF THE INVENTION

The object of the present invention is to meet such a need.

In particular, the present invention aims to provide a modular control device, highly customizable, expandable and reconfigurable.

Such objects are achieved by a control device as described and claimed herein. Preferred embodiments of the control device according to the present invention are also described.

The modular control device according to the present invention comprises:

a plurality of control modules, each comprising at least one control member operable by a user and an electronic module interface, adapted to convert a command imparted by the user to said control member into an electrical control signal and comprising electrical module contacts;

a module housing base, comprising an electronic motherboard where a plurality of electrical base contact groups is formed, arranged as an array, each electrical base contact group being adapted to implement an electrical connection with the electrical module contacts; and an electronic connection interface operatively connected to the base.

Each control module is provided with releasable coupling means adapted to allow a quick fitting and release of each control module on and off the base.

The motherboard is configured to bring the electrical power to each control module fitted on the base, recognize the placement and the orientation of each module fitted on the base, and transmit to the electronic connection interface the electrical control signals generated by the control module.

The electronic connection interface is configured to convert the electrical control signals into electrical output signals compatible with the device, process or application to be controlled.

In one embodiment, at least one control module is provided with a light and/or sound signaling means, and the electronic connection interface is configured to transmit to such a control module an input signal adapted to modify the status of the light and/or sound signaling means in response to the receipt of an electrical control signal transmitted by the control module.

In one embodiment, the control modules have a square plan, and wherein each electrical base contact group is repeated four times offset by 90° in order to allow the fitting of each control module on the base on according to any one of four orientations offset by 90°.

In one embodiment, each electrical base contact group and the corresponding electrical module contacts comprise at least two power supply contacts, one identification contact for a module identification signal and two bus contacts for a main bus for the transmission of electrical signals to and from the control module.

According to an aspect of the invention, each control module comprises a power supply circuit adapted to enable the power supply of the control module only when the module is fitted on the base. This power supply circuit is based on the detection of the signal current applied between a module identification pin and earth.

In one embodiment, the electronic motherboard is configured for:

applying in succession an identification signal to each of conductive lines arranged in rows and columns between the groups of the array of electrical base contacts;

after each application of said identification signal, sending a global addressing message adapted to be processed by all control modules fitted onto the base, said global addressing message containing an identification information of the conductive line to which the identification signal has been applied.

Each control module is configured to store this identification information of the conductive line when receiving the identification signal.

The electronic motherboard is configured to send a query signal to each group of electrical base contacts and to receive from each control module fitted on the base, in response to such a query signal, the conductive line identification information previously stored by the control module.

In one embodiment, the electronic connection interface comprises an interface memory wherein all the different control functions associated with respective different control modules are stored; each control module comprises a module memory where a "module type" constant is stored that identifies the module control function and that is sent to the electronic connection interface after identifying the module position so that the electronic connection interface creates an association between the control functions and the control module positions.

In one embodiment, the module memory also contains an identification constant which is sent to the electronic connection interface after identifying the position of the modules, the electronic connection interface being adapted to communicate with the module using said identification constant regardless of the position of the control module.

In one embodiment, the module memory, or, in an alternative embodiment, a base memory, contains an "Event-Messages" parameter which is transmitted to the electronic connection interface after the identification of the control module, and which identifies the data of the electrical output signals to be sent following a module event.

In one embodiment, the module memory or, in an embodiment variant, the base memory, also contains an "Event-Macro" parameter that is transmitted to the electronic connection interface after the identification of the control module, and which identifies a sequence of control functions or a combination of control functions (associated with pre-defined sequences/processing and pre-loaded in the electronic connection interface) that are executed after a module event.

According to an embodiment, the control modules are selected from:

"button", adapted to generate a control signal as a function of to its pressed/released state, of the pressure movement speed and of the value of the pressure exerted;

"potentiometer", adapted to generate a control signal as a function of the angular position of a pin;

"fader", adapted to generate a control signal as a function of the linear position of a cursor;

"encoder", adapted to generate a control signal as a function of the angular position thereof and of the rotation direction;

"display", comprising a display of information received from the electronic connection interface through the electronic motherboard;

"joystick", comprising a control means and a transducer capable of converting the position of the control means in a position information with respect to the Cartesian axes;

"JogWheel", comprising a control disc and a transducer capable of converting the angular position of said control disc into an electrical control signal;

"Track bar", comprising a transducer capable of detecting the position of the user's finger with respect to a surface;

"Wireless" module, adapted to add wireless connectivity to the control device.

According to an aspect of the invention, the connection interface is remotely connected to the electronic motherboard.

In an embodiment variant, the electronic connection interface is integral with the base of the control device.

According to an aspect of the invention, the control device further comprises configuration hardware and software means operatively connectable to the electronic connection interface. Such hardware and software means comprise a user interface and are configured to display on the user interface a reproduction of the base in which the modules fitted on the base, their position, their orientation, and their state are displayed.

In a preferred embodiment, the hardware and software means are configured to assign and/or modify a control function associated with a position of a control module on the base.

According to a preferred embodiment, the hardware and software means are configured to execute a module setting comprising at least one setting of at least some of the features of a control module.

Further features and the advantages of the control device according to the present invention will be evident from the following description, provided by way of non-limiting examples, with reference to the accompanying drawings.

BRIEF DESCRIPTION OF THE FIGURES

FIG. 7 is a table showing examples of parameters that characterize a control module;

DETAILED DESCRIPTION

Figure 1:
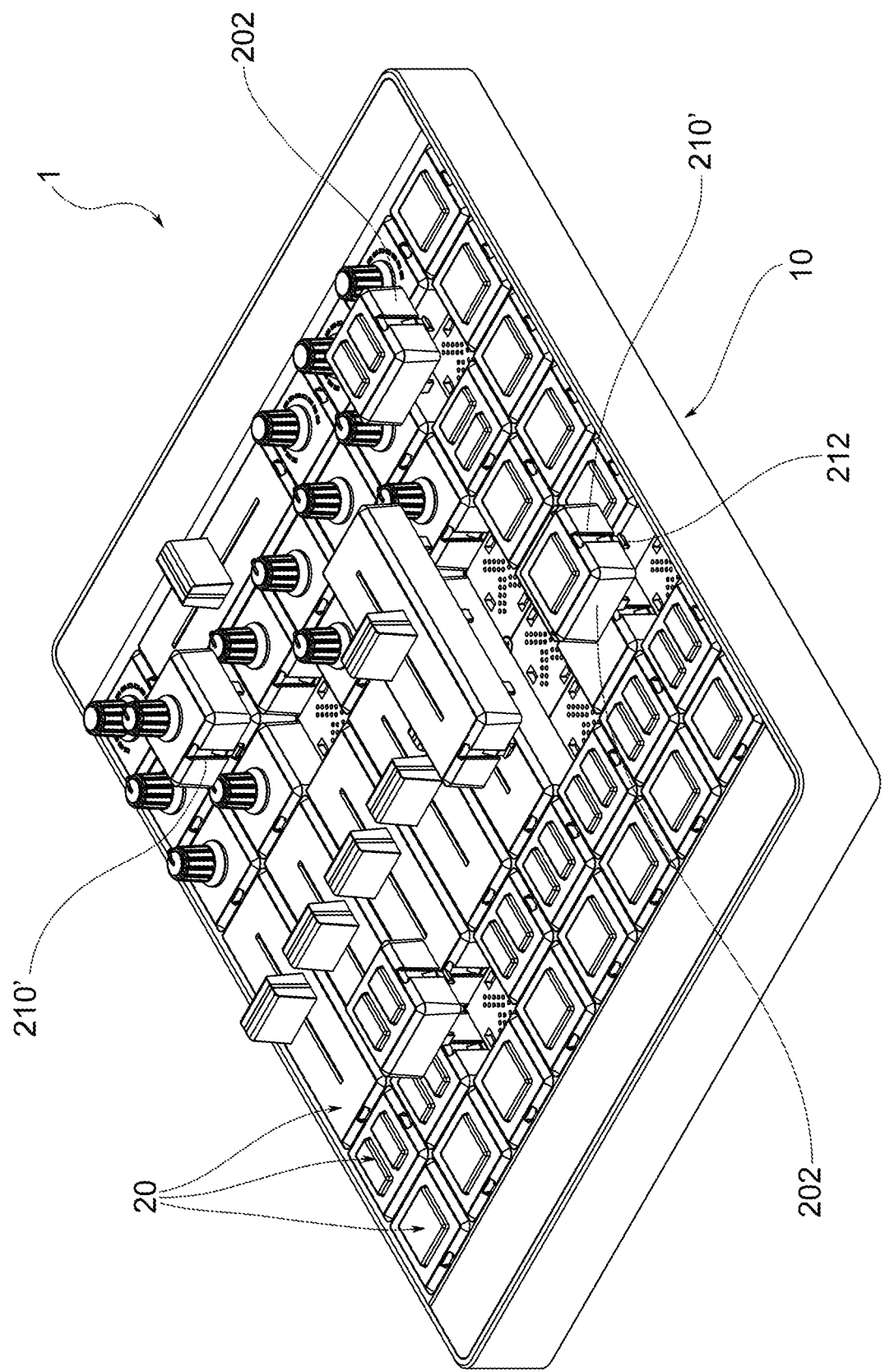
FIG. 1 is a perspective view of the control device according to the invention, with some control modules mounted on the base and others separated from the base.

In the following description, the following terms will be used:

script: program assigned to the electronic interface to execute the most complex and demanding functions and automations (for example, "Program change" functions belonging to the MIDI output protocol);

method: action that can be requested to a module (e.g. activation of an LED of a module);

event: action generated by a module (such as pressing a button) to which the electronic interface responds by sending electrical signals to the output, executing a macro or executing a script;

messages: electrical signals sent to the output in the form of a specific serial protocol of the device, process or application to which the control is connected (e.g. MIDI message). The messages are also serial communications between module/base, module/electronic interface and base/electronic interface;

macro: sequences of calculations applied to variables (such as the value of a potentiometer or a button pressing speed) to obtain results to be used for certain purposes (e.g. message code to be sent to the output).

In one embodiment, the control device, indicated with reference numeral 1 as a whole, comprises a base 10 acting as a case adapted to receive control modules 20 formed by single electronic interfaces, so as to offer maximum flexibility in implementing its configuration.

The case can be of different sizes and can accommodate a large number of modules. For example, the case can form an array of 8 rows and 8 columns adapted to accommodate a maximum of 64 modules.

The control modules 20 comprise single electronic interfaces and can implement input and output controls adapted for different sectors (from the music market to gaming, to lighting, etc.) such as pads, buttons, encoders, potentiometers, faders, motorized faders, displays, LEDs, joysticks, keyboards, buttons with OLED graphic display.

The control modules 20 can be fitted and removed as desired inside the case in order to create a large number of possible configurations.

When the modules are inserted, they are automatically locked inside the case by means of a quick coupling system that will be described hereinafter. The modules become stable once inserted into the case. In order to remove them, it is necessary to act mechanically again, for example through special extractors. Preferably, each module can be oriented, on the base array, both in a horizontal position and in a vertical position, so as to allow greater flexibility of use.

Each control module 20 comprises a module body 202 which protects and covers the electronic components.

The base 10 comprises a motherboard 102. Each module 20 is connected to the motherboard 102 of the base through electrical module contacts 204 placed under the module. These electrical module contacts 204 allow the transfer of information between the single module and the motherboard 102 of the base.

Each module 20 has an electronic interface that is able to communicate with the motherboard 102 of the base 10. In particular, this electronic module interface allows the base motherboard to recognize the position, the orientation and the ID (that is, the type of control and therefore of module). In one embodiment, since the module is "intelligent", it is possible to re-program it also at a later time to update and increase its potential.

For example, through a configuration software, installed for example on a Personal Computer 500, the user can set some intrinsic parameters of the module (for example the sensitivity of an encoder) and save them directly inside the module. Through this software one can also manage the settings of the motherboard present in the case.

In one embodiment, the control device can communicate with the Personal Computer or other devices via a USB cable, or even wirelessly through the use of Wi-Fi, Bluetooth or other similar non-wired technologies. In some cases, the control device 1 can control devices such as synthesizers 400 through the use of dedicated MIDI ports 402 without necessarily being connected to the PC (FIG. 8).

Figure 8:
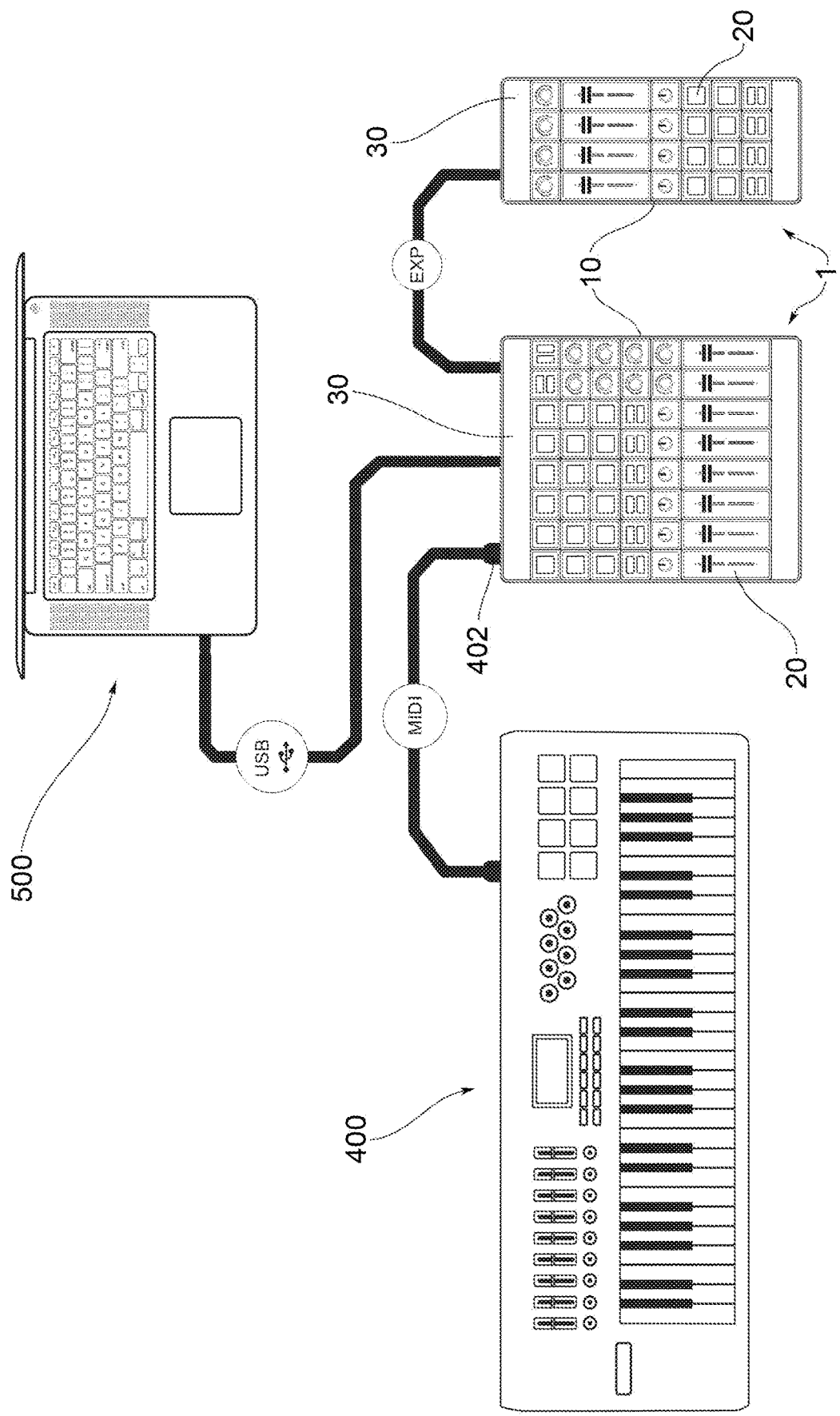
FIG. 8 shows an example of connection of a control device to a Personal Computer and to a device to be controlled.
Figure 9:
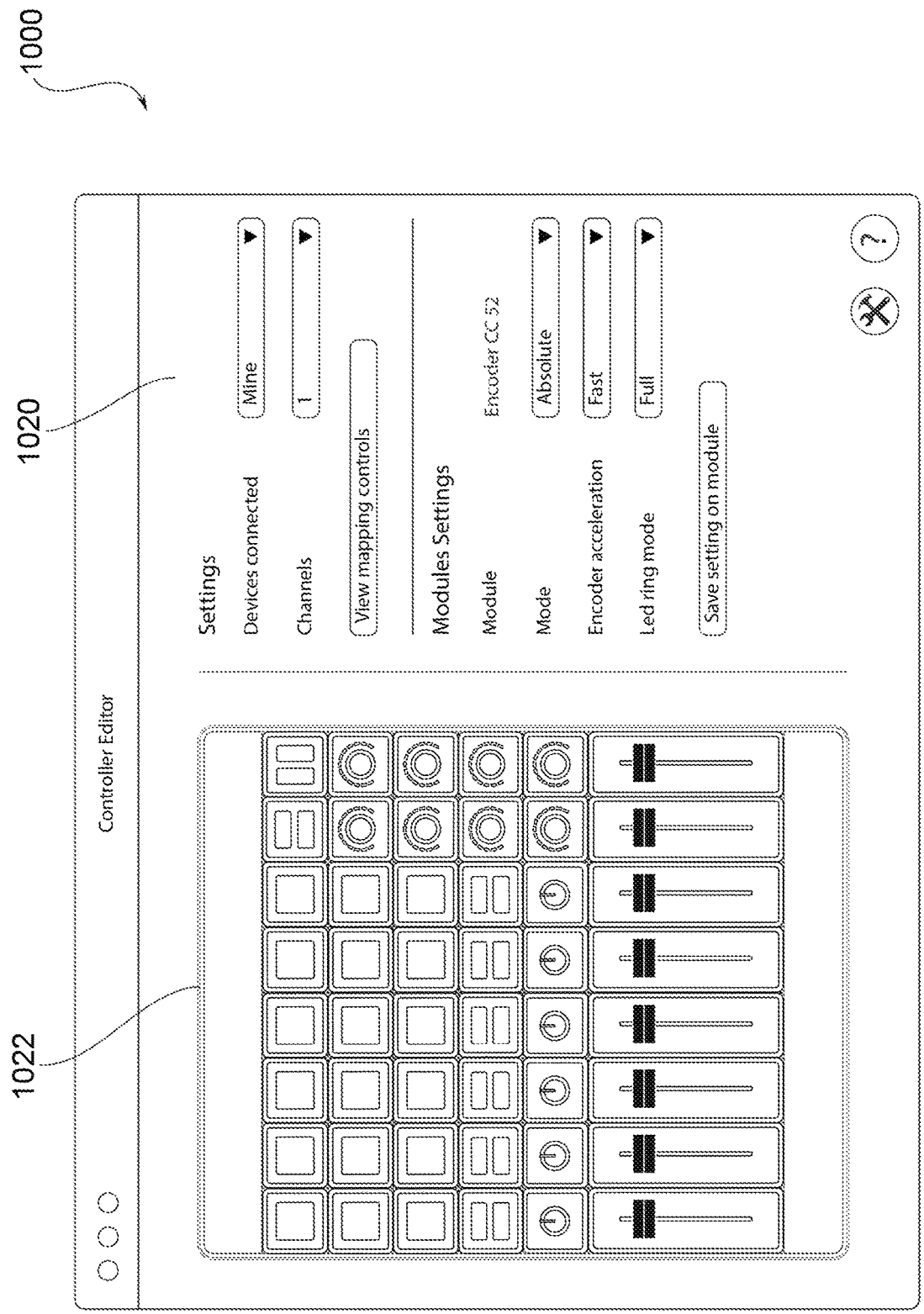
FIG. 9 is an example of a screen of the configuration software graphical interface.

As illustrated in FIG. 8, a control device 1 can also be connected to another control device 1, and both are recognized by the configuration software as a single device.

Figure 2:
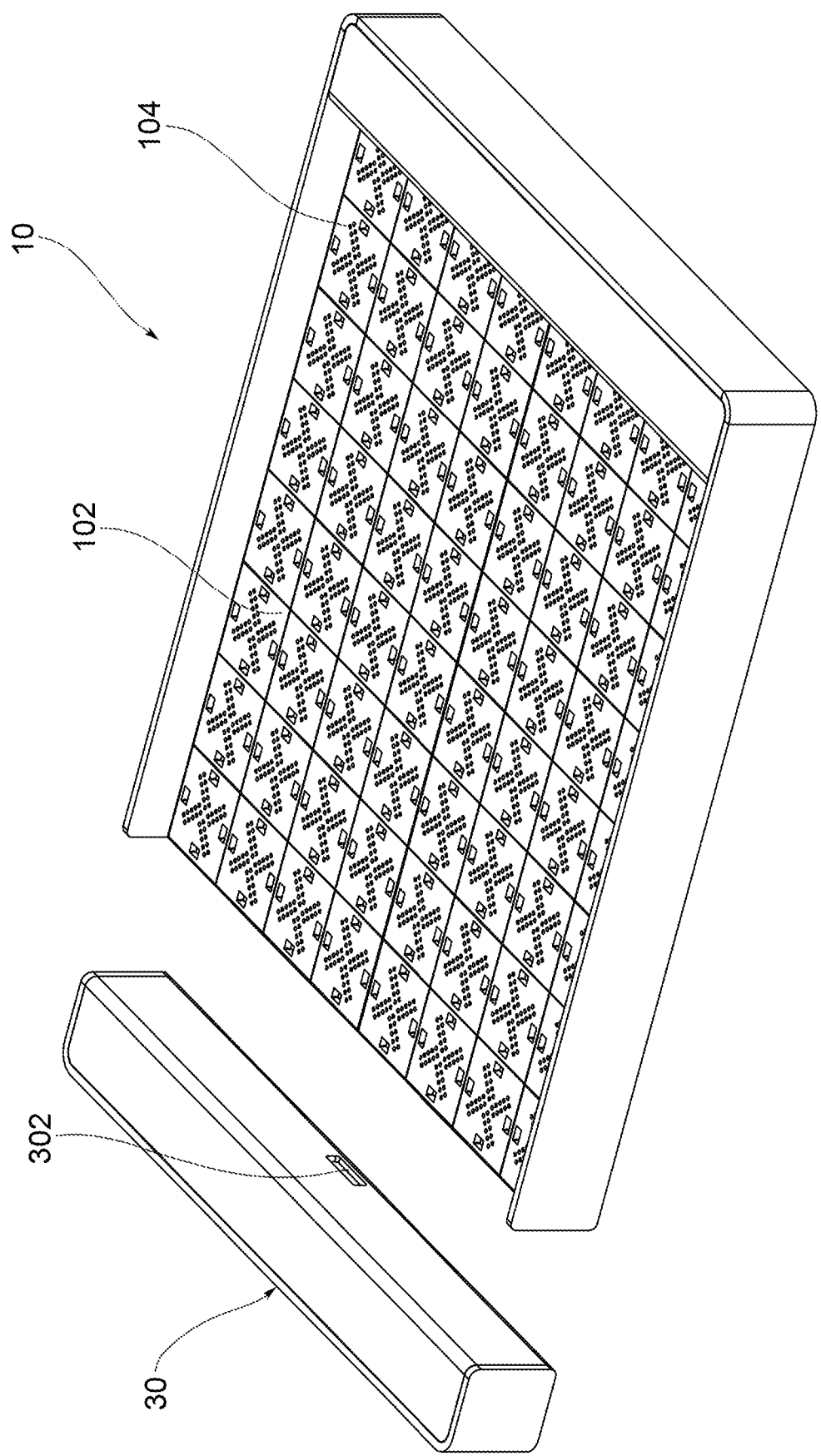
FIG. 2 is a perspective view of the base alone.

The control device 1 comprises an electronic connection interface 30 which mainly deals with managing the communication between the control modules 20 and the devices, processes or external applications to be controlled. In the remainder of the description, this electronic connection interface is also called "removable unit" because, in a preferred embodiment, it can be removed from the base and replaced with another one (FIG. 2). As mentioned above, however, the electronic connection interface can be integral with the base.

Removable units 30 may have different features and functionalities to allow communication between the control device and different devices, such as sound cards, synthesizers, connectors of different types, data storage units, etc.

Some examples of practical embodiment of the elements that make up the control device will now be described.

In a preferred embodiment, the control device comprises the following main components:

base 10: mainly accommodates the control modules 20. It is an active part because it is responsible for identifying the control modules and communicating their arrangement to one or more removable units 30;

removable unit 30: it is the interface to the external world capable of supporting different communication protocols (with relative physical interfaces) such as MIDI (music sector), HID (user interface sector for Personal Computer) and DMX (lighting sector);

control modules 20: are accommodated by the base 10 and have different features;

configuration software 1000: provides a graphical user interface 1020 on a Personal Computer or similar device that can be connected to the removable unit.

Base

The base 10 has the main function of accommodating the control modules 20 supplying them with power (which is enabled only if the module is present), the communication buses and the identification and orientation function (managed by a microcontroller). The connector for interfacing with the removable unit 30 is also positioned on top of it.

In one embodiment, the base receives power from the removable unit.

The electrical connections for the control modules are arranged on an electrical connector 104 directly engraved on the printed circuit board (the motherboard 102). This electrical connector 104 is repeated four times rotated by 90° for each module so as to allow the positioning of the module at 0°, 90° 180° and 360°.

On this electrical connector 104 the power supplies, the identification signal and the communication buses pass.

The following table shows an example of a connection:

| 1 | Power supply | $+V_{ALIM}$ | Essential for |
| 2 | | $-V_{ALIM}$ | all modules |
| 3 | Main bus | A1 | |
| 4 | | B1 | |
| 5 | Identification | ID | |
| 6 | Secondary bus 1 | A2 | Optional |
| 7 | | B2 | |
| 8 | Secondary bus 2 | A3 | |
| 9 | | B3 | |
| 10 | Optional line | OPT | |

The base 10 is connected to the removable unit 30 via a removable unit connector 302. This connector is made in such a way as to allow easy removal and insertion by the user. On this connector, the power supplies, the module buses and the base/removable unit bus pass, as in the following example:

| 1 | Power supply | $+V_{ALIM}$ |
| 2 | | $-V_{ALIM}$ |
| 3 | Main module | A1 |
| 4 | bus | B1 |
| 5 | Secondary | A2 |
| 6 | module bus 1 | B2 |
| 7 | Secondary | A3 |
| 8 | module bus 2 | B3 |
| 9 | Base/expansion | A4 |
| 10 | bus | B4 |

Figure 4:
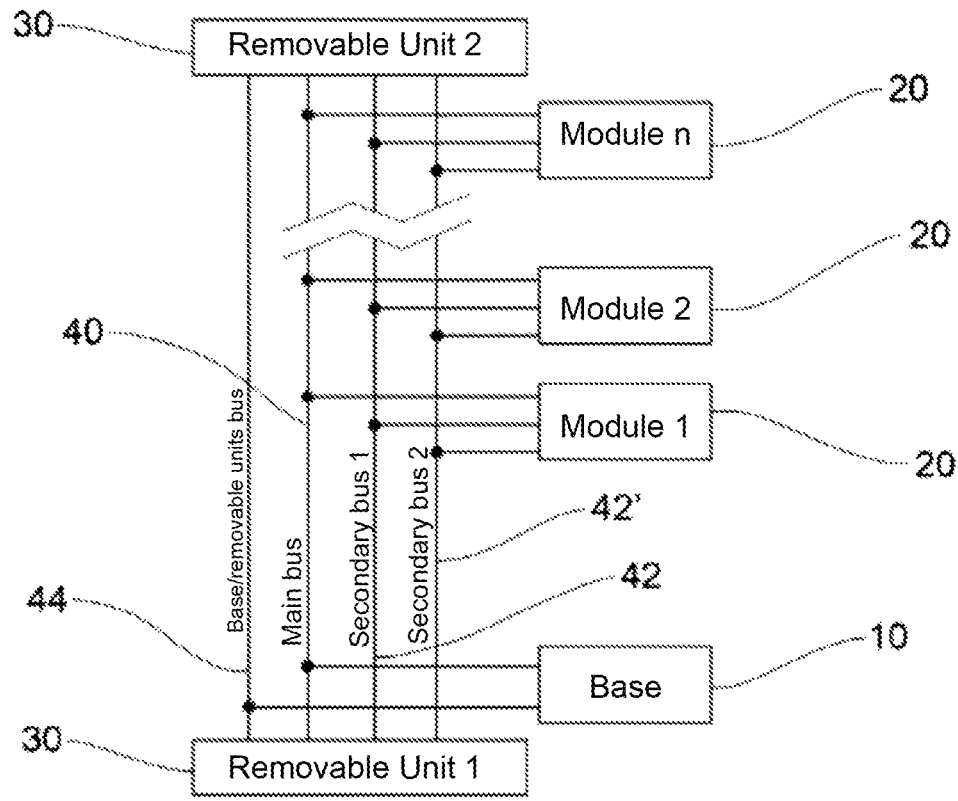
FIG. 4 is a connection diagram through a communication bus between two removable units, a base and control modules.

Communication buses allow communication between modules, base and removable unit. They are divided into three types: main bus modules 40, secondary bus modules 42, 42' and base/removable unit bus 44 (FIG. 4).

The "main module bus" 40 is used for basic functions such as identification, ordinary management and communications that do not require a large data stream such as receiving events, executing methods and setting properties of the modules. All modules must necessarily have this bus, otherwise they are not able to operate and remain invisible to the control device. The messages used in the communications are specific to the modules and not based on the type of use for which the device is intended: for example, a "Button" module sends messages of pressed or released button and not the message with the final protocol construct (MIDI, HID or DMX). The removable unit takes care of the conversion to this message.

The "secondary module buses" 42, 42' are reserved for large data streams that must not interfere with the normal operations reserved for the main bus. Given their destination, communication between modules and base via this secondary channel is not required; therefore, the base only provides a link between the modules and the removable unit, which uses these buses as needed. In one embodiment, the buses are two so that they can take advantage of full-duplex communication: one for communication from module to base and one for communication from base to module. For example, a Wi-Fi module could use these secondary communication channels to directly access the central microcontroller of the removable unit without interfering with the messages of the other modules.

The "base/removable unit bas" 44 allows communication between the base 10 and the removable unit 30. A preferential channel is used to avoid interference with other communications.

For communications on the buses, a balanced serial RS485 is used, which allows multiple devices to be connected on the same bus.

The bus is balanced and consists of two signals (A and B) with reference to earth and has the following features:
Communication is half-duplex type
The modules, the base and the expansion handle overlapping message conflicts.
The maximum speed is 20 Mbit/s
It is protected against electrostatic discharge
As for the secondary buses 42, 42', they typically use the RS485 serial described above but alternatively another type of balanced serial established by the connected removable unit can be used.

The protocol used for the main bus works on messages containing the following information:
Sender address (row and column of a module or base)
Recipient address (row and column of a module or base)
Command
Data
Sequential number
Message integrity checksums
The possibility of having an acknowledgment of response to the sending of each message is selectable.

Figure 5:
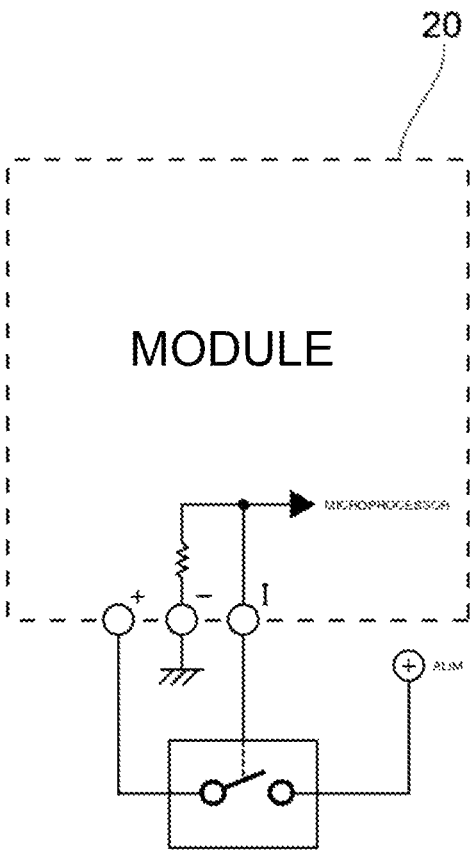
FIG. 5 is a diagram of the electrical supply circuit of a control module.

The power supply of the module is enabled only when the module is fitted onto the base in order to prevent possible short circuits on the exposed connectors. The status check of module fitted is performed by detecting the current of the signal applied between the identification pin and earth according to the circuit diagram in FIG. 5.

On Pin + of the module connector there is no voltage until the presence of the internal resistance of the module connected between pins I and − is detected.

In addition to providing this information, Pin I is used to identify the module.

Through the identification signal it is possible to recognize the position and orientation of each module, as will be described in more detail below. The signal is connected to a grid of conductive lines 106, 106' arranged in rows and columns on the motherboard 102 (for example 16 rows and 16 columns for 8×8 modules for orientation); a signal is first applied that scans the rows and then the columns, or vice versa.

The detection of the position and orientation of all the modules takes place in two steps.

In a first step, the base makes a position assignment to the modules. In particular:
a low level is applied to the identification signal of the first row of connectors 104 and corresponding modules.

A global addressing message is then sent (that all the modules connected to the base process) in which the identification signal information of the first row (or column) is contained;
the modules with the identification signal memorize the message received which assigns the row (or column) position and respective connected connector (high or low with respect to the row or column), between the two connectors connected to the row or column;
the operation is repeated for all the rows (or columns) and then for all the columns (or rows).

In a second step, a verification of the assignment and a reading of the positions is carried out. In particular:
a global addressing message is sent by the base to check if all the inserted modules have been assigned the position. If all the modules have an assigned position then the base will not receive a response, otherwise the unassigned modules will send an error message to request repeating the assignment. For example, the operation can be repeated only 5 times (in case of repeated error) after which the unassigned modules are disabled by a global message and ignored by the base.

Thereafter, each module is queried, via serial bus, to reconstruct the layout thereof in the base. The information provided by the module is presence, position, orientation and occupied positions. The absence of modules in the queried position is verified by the lack of answer to the query.

For example, the identification operation is performed after the following events:
power on;
after a reset;
after the assignment verification message with modules that have not been identified correctly;
fitting a module (the module sends a message to the base when it is fitted);
release of a module (on verification of the supply voltage enabling).

The mapping of the identified modules will then be sent to the removable unit via the RS485 serial shared with the modules.

Figure 3:
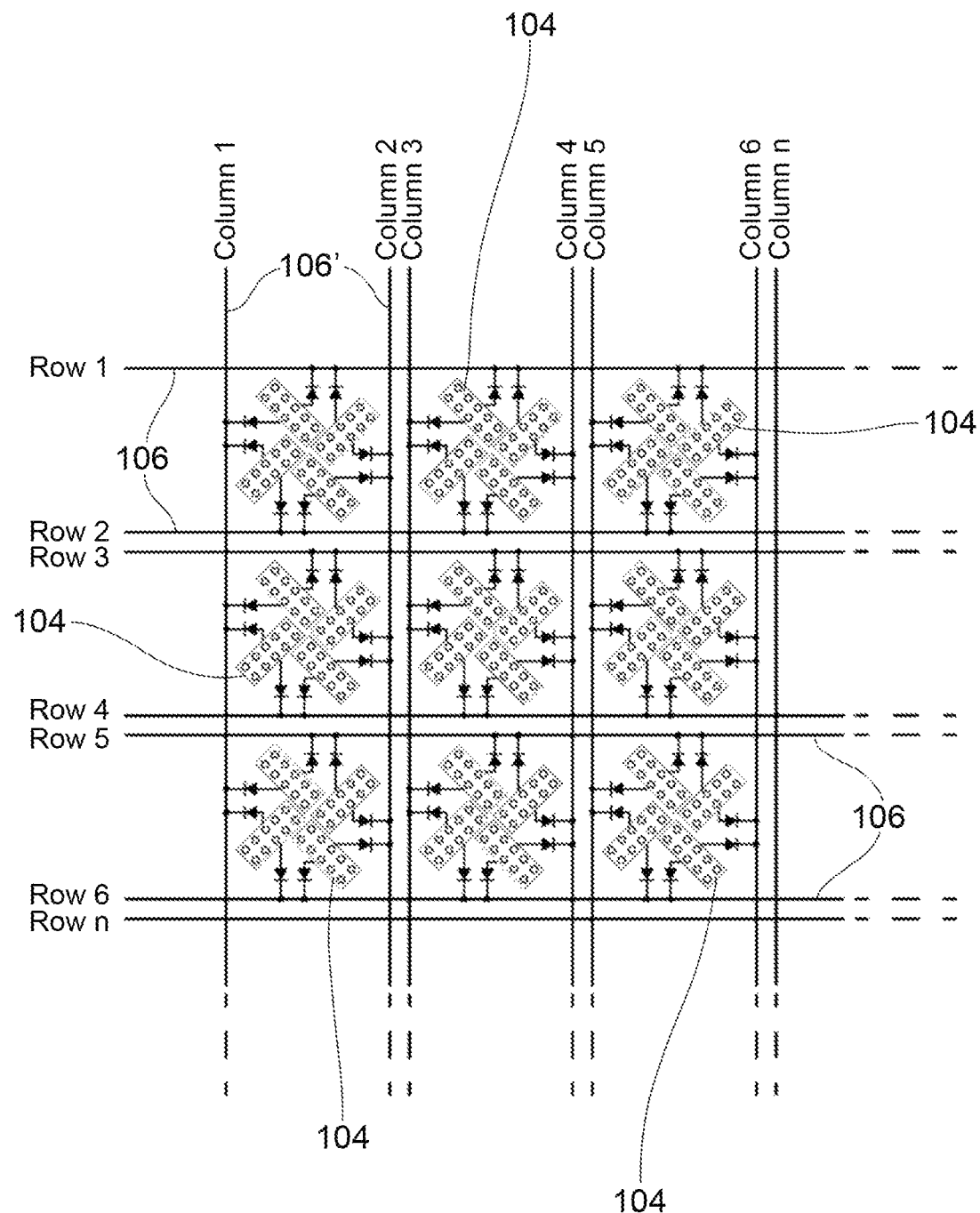
FIG. 3 shows a top view of a portion of the grid of the electrical connections of the base for connecting the control modules.

FIG. 3 shows a portion of the grid of electrical lines 106, 106' arranged in rows and columns to which the identification signals are applied in sequence. In particular, the groups of electrical contacts 104, repeated four times offset by 90°, are noted for each fitting position of a module. Each group of electrical contacts 104 is connected to a row 106 and to a column 106' of the grid of electrical lines.

Removable Unit

The removable unit 30 contains the intelligence, the power supply, and the means of communication with a Personal Computer 500 or similar device.

Advantageously, the removable unit can be replaced to allow the control device to change functionality, intended use, evolve and expand.

The removable unit is programmed by scripts. With the scripts, the control device has the possibility to execute very advanced operations and to adapt to the customizations of each user. When a removable unit is programmed with certain scripts, it can execute the functions created independently (stand-alone).

Below are some examples of utilities provided by scripts.

Instructions: they are the foundation of scripts and correspond to the commands to be executed.

Control structures: they control the program execution flow and are divided into iteration cycles and conditional structures.

Variables: can be used in scripts to store values during execution. When a variable is created, it takes a default value; during the execution of the script, new values can be assigned.

Expressions: set of mathematical operations and not only with variables.

Timer: timers are used in scripts to execute time-based operations. Timers can be set with predefined times, started and stopped; at the expiry of the set time, the timer generates an event which will be followed by predefined operations. For example, a timer can be used to flash an LED of a button module according to the following procedure:

a) an LED on status is assigned to a variable;
b) the timer is started;
c) the script receives the elapsed time event and sends to a module the message containing the assignment of the status property of the LED stored in the variable;
d) the value of the variable is denied (from on to off);
e) repeat from step b).

Scripts can interact with module resources and thus trigger event-driven operations, execute methods, or set module properties.

For example, the green LED of a button can be turned on while pressing it with a script built as follows:

Pressing the button causes the corresponding message to be sent to the removable unit containing the pressed button event;

the script receives the event and sends the message containing the assignment of the LED on status property to the same button;

the release of the button causes the sending of the relevant message containing the button event released to the removable unit;

the script receives the event and sends the message containing the assignment of the LED off status property to the same button.

The scripts can interact with MIDI messages and then send messages to the Personal Computer or the connected device on the corresponding port (MIDI) and at the same time activate events caused by received MIDI messages.

In the previous example it is possible, after pressing the button, to send a MIDI note to a synthesizer, connected to the MIDI out port channel 1, which at the first pressure corresponds to the lowest note of the scale and at the subsequent pressures the note grows:

The lowest note of the scale is assigned to a variable;

Pressing the button causes the corresponding message to be sent to the removable unit containing the pressed button event;

the script receives the event and sends the message containing the assignment of the LED on status property to the same button;

at the same time, the script sends a MIDI message of "note on" to channel 1 containing the note memorized in the variable and the "velocity" received from the button, causing the execution of the note;

the release of the button causes the sending of the relevant message containing the button event released to the removable unit;

the script receives the event and sends the message containing the assignment of the LED off status property to the same button;

at the same time, the script sends a MIDI message of "note off" to channel 1 which interrupts the execution of the note;

the note stored in the variable is increased for the next press of the button.

Scripts can interact with HID communications and thus send messages to the Personal Computer 500, emulating keyboards, mice, joysticks or other input devices.

In the previous example it is possible, after each press of the button, to increase the volume of the Personal Computer:

Pressing the button causes the corresponding message to be sent to the removable unit containing the pressed button event;

the script receives the event and sends the message containing the assignment of the LED on status property to the same button;

at the same time, the script sends a message corresponding to the "volume up" button of a keyboard, causing the volume of the Personal Computer to increase;

the release of the button causes the sending of the relevant message containing the button event released to the removable unit;

the script receives the event and sends the message containing the assignment of the LED off status property to the same button.

Scripts can interact with DMX communication and then send messages to the device connected on the respective port.

In the previous example it is possible, after pressing the button, to also send a DMX message to a dimmer to control a lamp, connected to channel 1, which the first pressure corresponds to the lowest brightness and at the subsequent pressures, the brightness grows:

The lowest brightness level is assigned to a variable;

Pressing the button causes the corresponding message to be sent to the removable unit containing the pressed button event;

the script receives the event and sends the message containing the assignment of the LED on status property to the same button;

at the same time, the script sends a DMX message to channel 1 containing the level stored in the variable, causing the brightness of the lamp to be adjusted to the level of the variable;

the release of the button causes the sending of the relevant message containing the button event released to the removable unit;

the script receives the event and sends the message containing the assignment of the LED off status property to the same button;

the brightness level stored in the variable is increased for the next time press of the button.

To communicate with the modules and use them in the scripts it is necessary to identify them. In one embodiment, there are two ways in which modules can be identified:

Position: the module is identified by its position (row and column) in which it was inserted in the device;

GUID: the module is identified by its unique identifier.

Control Modules

Figure 6:
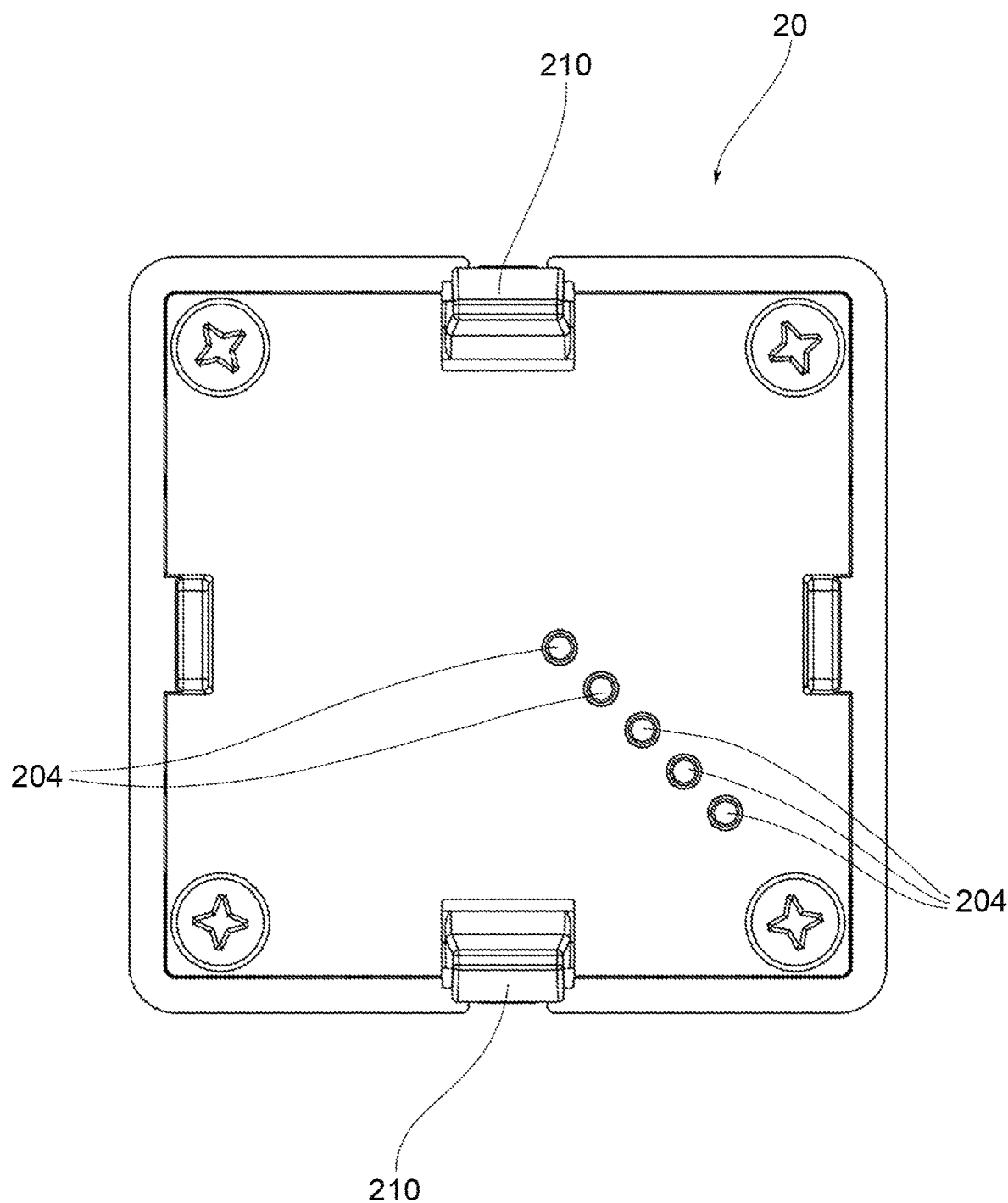
FIG. 6 is a plan bottom view of a control module.

Control modules 20 are electrically connected to the base by means of electrical module contacts 204 (FIG. 6).

The non-volatile memory of the modules contains various operating parameters.

The table in FIG. 7 shows an example of a set of module parameters, which also includes an indication of the assignment mode:

The "module type" parameter is a constant contained in the module firmware and sent to the removable unit after identification. It is intrinsically linked to the module that contains all the features corresponding to the type. It is used by the removable unit, which already needs to have loaded the module type functionality to define its behavior. This constant can be used in the configuration program to display and set the correct module.

The "Unique Identifier (GUID)" parameter is a constant contained in a non-volatile memory on board the module and sent to the removable unit after identification. It is used by the removable unit, if set in the ID control mode, to communicate with the module irrespective of its position. Since the removable unit communicates with the modules by addressing them with row and column, in order to communicate with a module to which a given ID is assigned, it must previously have detected its position by means of the identification made by the base. The configuration program can display the constant value.

The "setup" parameters are a block of information assigned in production during the programming or testing of the module. It contains operating parameters, setup, any customizations for variations and calibrations of the module. These parameters are used directly by the module.

The "position and orientation" parameter is a variable assigned during the identification of the modules, according to the procedure described above. It contains the value of the row, the column, and the orientation of the module. After identification, the module transfers these variables to the base and then the base sends the mapping to the removable unit. It is used by the removable unit, if set in the position control mode, to communicate with the module inserted in a predetermined position. This information can be used in the configuration program to display the position and orientation of the modules.

The "Color" parameter is assigned by the configurator and stored in the module. In an embodiment variant, this parameter is stored in the base memory and transferred to the module. It is again used by the configurator to visually identify the modules. The module can use this information and convert it in a physical manner, for example by activating a similar LED emission.

The "Event-Message" parameter is transferred by the module to the removable unit after module identification and is managed by the removable unit itself. In an embodiment variant, this parameter is stored in the base memory and hence transferred to the removable unit. Upon the occurrence of a specified event generated by a module (for example the pressure of a button), the module sends the corresponding serial message to the removable unit; the same extracts from the memory the memorized message code associated to the event and to the module and sends its contents to the final application (for example the code to generate an MIDI musical note).

Through the configuration program it is possible to assign messages to events, properties and commands of the modules.

The macros are passed from the modules, or, in an embodiment variant, from the base memory to the removable unit during the identification of the modules, and are managed by the same. The events generated by the modules are sent to the removable unit via the serial port which executes the relative stored macros. The removable unit in turn sends the commands and properties generated by the related stored macros to the module.

Macros can contain both simple message sequences and more complex processing.

Through the configuration program it is possible to assign macros to events, properties and commands of the modules.

Properties are values stored in modules that have a default value when the module is turned on and which can be changed during operation. In an embodiment variant, the properties have a default value when the control device is switched on.

The properties can be both read and write, and read-only and write-only. Properties can be assigned directly by the module or via messages from the removable unit.

The default value of the properties is the initial value (at power up or after a reset) taken by the properties.

Through the configuration program it is possible to assign these values to the properties.

Each module is also assigned a unique number (GUID) that allows recognition thereof. The usefulness of this identifier is to recognize a module irrespective of its position; the module for which functions have been assigned in the removable unit can be moved from one location to another on the base without losing its function. Modules can be moved even when the control device is switched on.

Some examples of control modules will now be described.

"Button" Module

The button module consists of a translucent silicone rubber button, backlit by an RGB (multicolor) LED. In addition to the click of the button, the speed of movement and pressure can be detected. It occupies a position on the base array. The following tables show some examples of the features, properties, methods and events of a button module:

| Feature | MIDI | DMX | HID |
| --- | --- | --- | --- |
| Illuminated button with multicolor RGB LED | Yes | Yes | Yes |
| Push-button in translucent silicone rubber | Yes | Yes | Yes |
| Aftertouch (intensity) | Yes | | |
| Velocity (envelope) | Yes | | |
| Assignable as CC, Note or Program change | Yes | | Yes |

| Property | Description | Type |
| --- | --- | --- |
| Button status | Reads the pressed or released status | Reading |
| Full button state | Reads the pressed or released status and the pressure level | Reading |
| LED status | Reads or sets the power-on status of the LED button and its color | Read/Write |

| Methods | Description |
| --- | --- |
| Flash LED | Starts a flashing of the LED with a sequence of colors and a speed assigned to the message |
| Stop flashing | Stops a flashing previously started |

| Events | Description | Type |
| --- | --- | --- |
| Press button | The button has been pressed. The message contains the time elapsed between button pressed and button released. | Reading |
| Release button | The button has been released. The message contains the time elapsed between button pressed and button released. | Reading |
| Pressure variation | With button pressed, the pressure has been changed. The message contains the pressure value. | Read/Write |

"Double Button" Module

The double button module consists of two translucent silicone rubber buttons, backlit by an RGB (multicolor) LED. In addition to the click of the buttons, the speed of movement and pressure can be detected. On the modular grid of the base it occupies position 1.

"Pot" Module

The Pot module consists of a potentiometer capable of converting the angular position of a pin to a corresponding value. The adjustment curve may be set (linear, logarithmic or customized). The rotation pin travel can also have the detent function on the central position. It can only make finite revolutions, typically less than 1.

"Fader" Module

The Fader module consists of a potentiometer capable of converting the linear position of a cursor to a corresponding value. The adjustment curve may be set (linear, logarithmic or customized). The displacement cursor can also have the detent function on the central position. On the modular grid of the base it typically occupies three positions (with a corresponding travel of 60 linear mm)

"Motorized Fader" Module

The Motorized fader module consists of a potentiometer capable of converting the linear position of a cursor to a corresponding value. The adjustment curve may be set (linear, logarithmic or customized). The displacement cursor can also have the detent function on the central position. The position of the cursor can also be moved either manually or through a motorized actuation system. On the modular grid of the base it typically occupies three positions (with a corresponding travel of 60 mm)

"Encoder" Module

The Encoder module consists of an angular position sensor. For each rotation step it sends information that allows determining its relative position and direction of rotation or, alternatively, absolute angular position. It can perform infinite revolutions and, with defined rotation steps, can also act as a detent. It is also possible to include a visual feedback with a circular array of LEDs with on-command lighting in the encoder module. On the modular grid of the base it occupies one position.

"Display" Module

The Display module consists of a programmable information viewer. It can only display numeric, alphanumeric or graphic information. It have a single or multiple color. On the modular grid of the base it occupies at least one position.

"Joystick" Module

The Joystick module consists of a transducer capable of converting the position of the control means in a position information with respect to the Cartesian axes. The control means can also be pressed as a whole, thus generating further information. On the modular grid of the base it occupies at least one position.

"JogWheel" Module

The JogWheel module consists of a transducer that converts the angular position of a control disc. The control means can also be pressed as a whole, thus generating further information. On the modular grid of the base it occupies at least one position.

"Track Bar" Module

The Track bar consists of a transducer capable of detecting the position of the user's finger with respect to a surface. It can identify a linear position, a position relative to the Cartesian axes, or a position in the space in three dimensions above it. The sensitive surface can also be pressed, thus generating further information. On the modular grid of the base it occupies at least one position.

"Pad with Display" Module

The Pad with Display module is the combination of a display module with a pushbutton module or a joystick module. On the modular grid of the base it occupies at least one position.

"Wireless" Module

The Wireless module is capable of adding wireless connectivity to the control device. It can add one or more communication protocols (Wi-Fi, Bluetooth, ZigBee, etc.). On the modular grid of the base it occupies at least one position.

We will now describe some examples of functions performed by the hardware and software configuration means 1000, called "configurator" for shortness.

When the control device 1 is connected to a Personal Computer 500 on which the configuration software is installed, a graphical user interface 1020 is activated in which it is possible to display a representation 1022 of the base, the removable unit connected to the base, the arrangement of the modules, the orientation of the modules, the status of the modules (for example the position of the potentiometer), a label assigned to the modules, the color assigned to the modules, the methods for identifying the modules assigned to the positions of the bases (Position/ID), any modules involved in shared functions (such as the "program change" function, in the case of MIDI), a summary of the module assignments, a summary of the assignments of the removable units, a summary of the shared features.

In addition, the configurator allows setting the removable unit. In particular, by selecting a base position, it is possible to assign functions to it and constrain them; these functions will have priority and therefore replace the specific ones of the controls inserted in that position. By selecting a group of modules it is possible to assign or modify shared functions; these functions will have priority and therefore replace the specific ones of the controls inserted in those positions.

In addition, the configurator allows setting the removable units. In particular, by selecting a removable unit it is possible to set its functions (for example to assign the scripts thereof).

In addition, the configurator allows setting the modules. In particular, by selecting a module it is possible to set the following features: label, color, default property values, parameters assigned to events, macros assigned to properties, methods and events.

Figure 10:
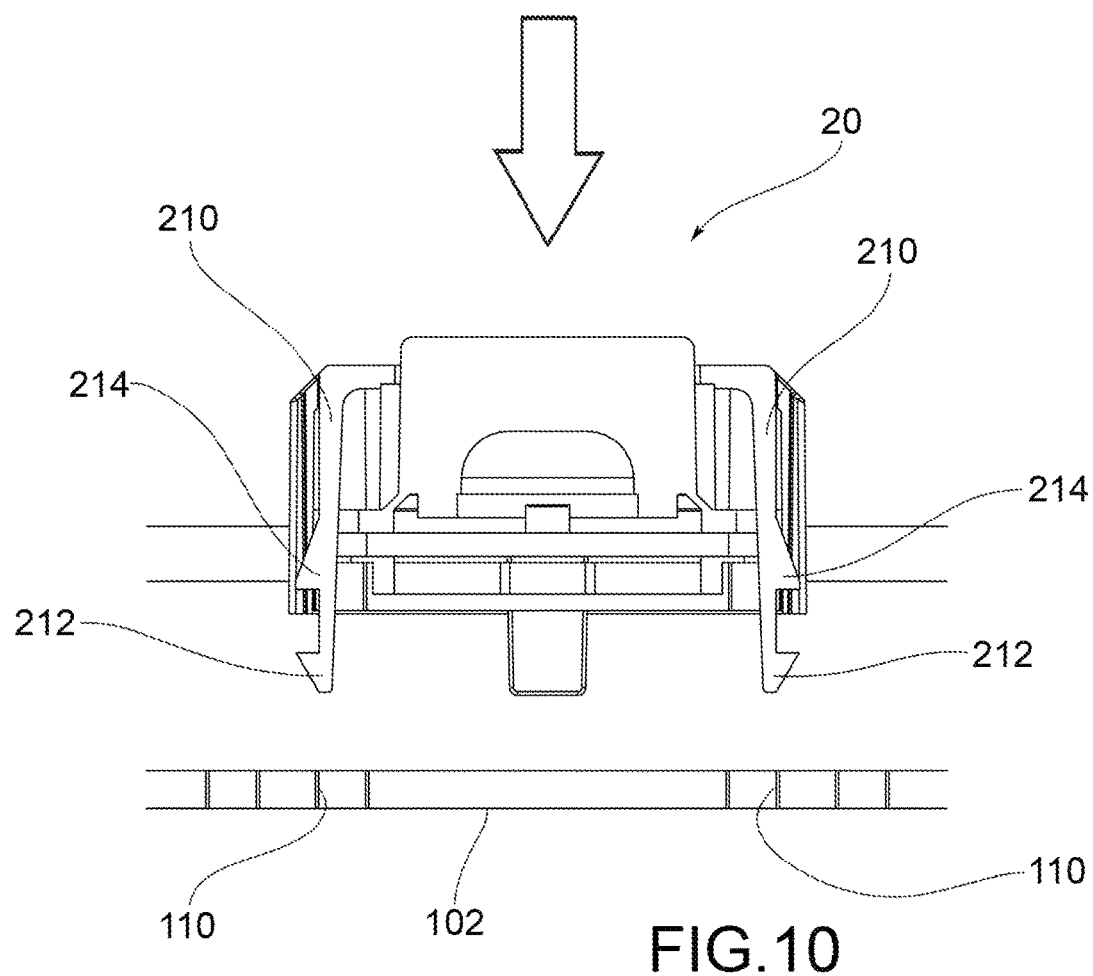
FIGS. 10-10d illustrate as many steps of the operation of fitting and releasing a control module on and off the base.

FIGS. 10-10d show a sequence of the fitting and release operations of a control module 20 on and off the base 10.

Each control module is provided, on the opposite sides thereof, with at least one pair of elastic coupling arms 210 adapted to snap-fit into corresponding coupling holes 110 formed on the electronic motherboard 102. Each of said elastic arms is provided, at its lower end, with a coupling tooth 212 adapted to snap-couple the lower side of the electronic motherboard 102. To this end, the coupling tooth 212 has a wedge shape so as to bend inwards during insertion in the coupling hole, and then snap into engagement position of the motherboard when the coupling tooth 212 has completely passed through the respective coupling hole 110.

In one embodiment, each elastic arm 210 is also provided with an uncoupling tooth 214, also in the form of a wedge. For example, this uncoupling tooth 214 is above the motherboard 102 when the module is attached to the base.

The uncoupling tooth 214 can be engaged by a rod-shaped extractor 250, in turn provided with a counter-tooth or an opening 252 adapted to axially engage the uncoupling tooth 214.

Preferably, each elastic arm 210 is formed in a lateral recess 210' formed in the module body, so as to allow the extractor 250 to be slid along the elastic arm to engage the uncoupling tooth without interfering with adjacent modules. Furthermore, this lateral recess 210' acts as a guide for the sliding of the extractor.

FIG. 10 shows a control module still separated from the base.

Figure 10A:
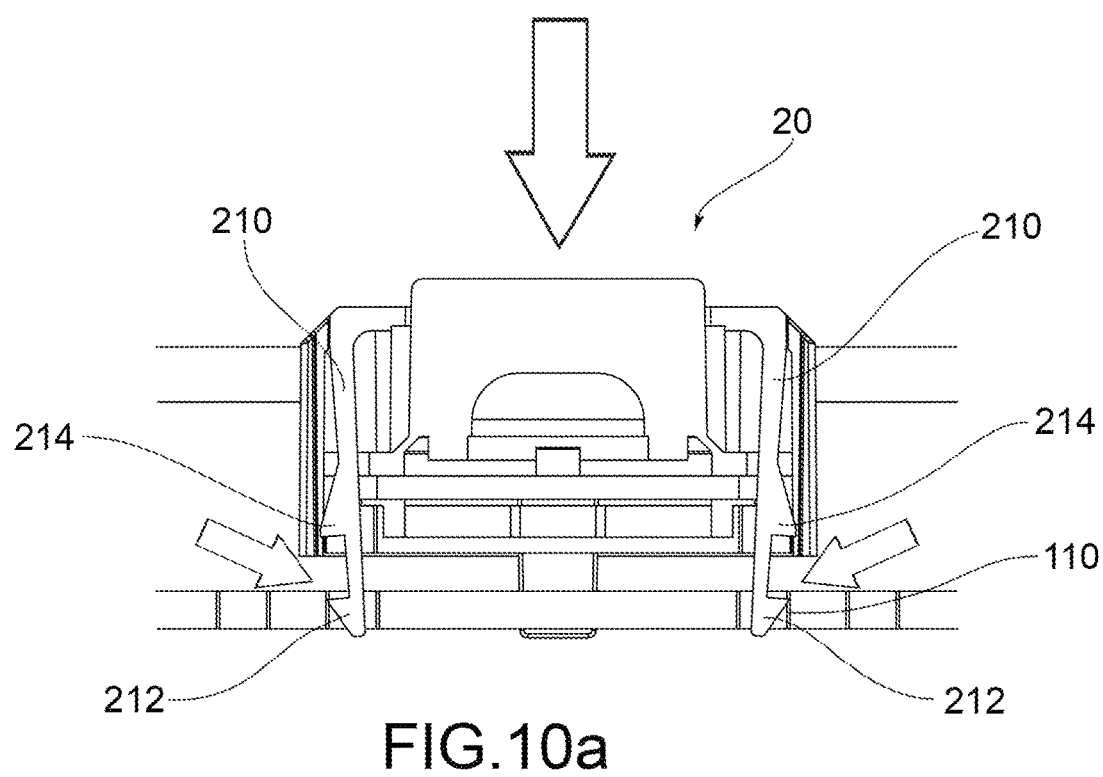

In FIG. 10a, the elastic arms are passing through the coupling holes and, by virtue of their wedge shape, bend inwards.

Figure 10B:
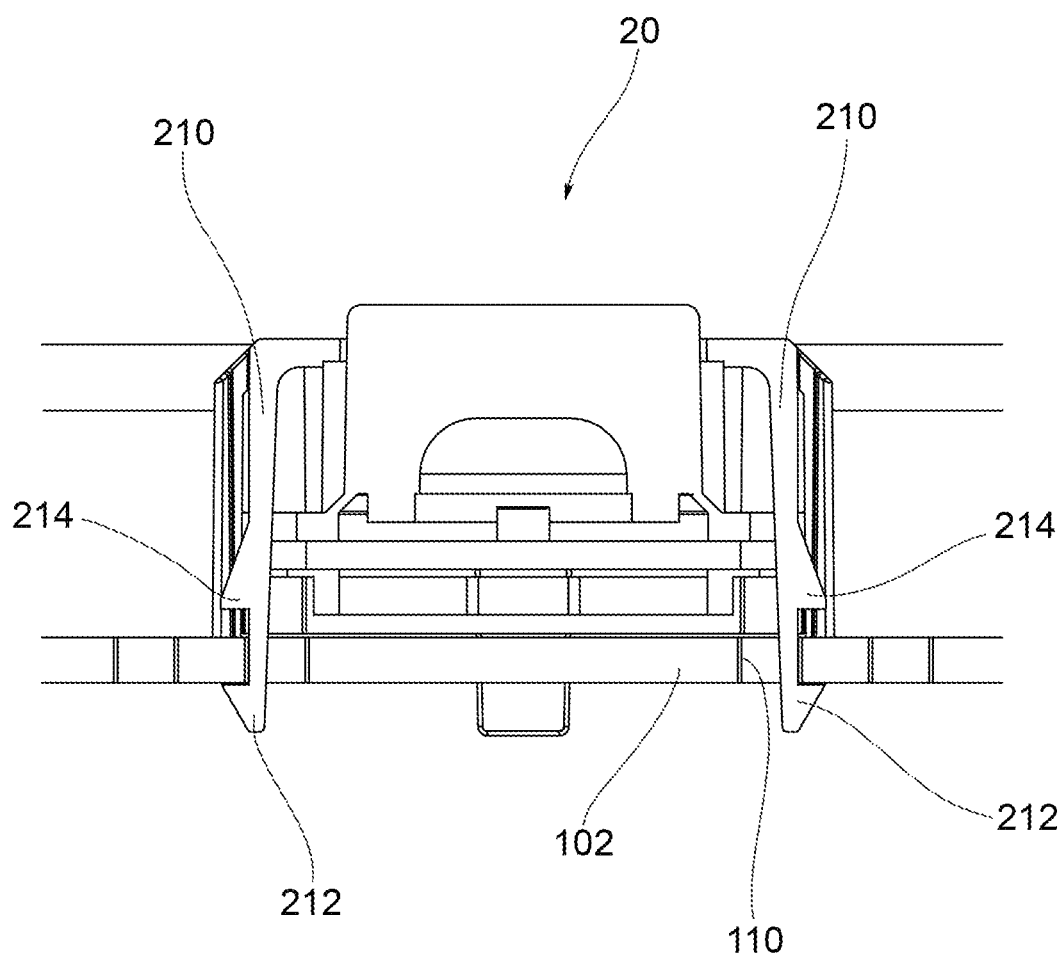

FIG. 10b shows the elastic arms, which, once the coupling teeth have passed through the coupling holes, snap into engagement position of the lower surface of the motherboard.

FIG. 10c shows the insertion of the extractors 250 in the respective lateral recesses 210' of the module body, in which the elastic arms 210 are formed.

FIG. 10d shows the extractors which, due to the wedge shape of the uncoupling tooth of the elastic arms, has caused the bending of the elastic arms towards the inside in order to disengage the respective coupling teeth from the motherboard. Furthermore, the counter-tooth of the extractors has axially engaged the uncoupling tooth. At this point, the extractors can be pulled upward by removing the module from the base.

Obviously, other quick coupling/uncoupling systems of the modules to and from the base can be used, including, for example, magnetic means.

A skilled person may make certain modifications to the present invention based on the description and drawings without departing from the scope of the invention. Each of the features described above as belonging to a possible embodiment may be achieved independently from the other embodiments described herein.

The invention claimed is:

1. A modular control device for controlling a device, a process or an application, comprising:
   a plurality of control modules, each control module comprising at least one control member operable by a user and an electronic module interface for converting a command imparted by the user to said control member into an electrical control signal and comprising electrical module contacts;
   a module housing base, comprising an electronic motherboard where a plurality of electrical base contact groups is formed, arranged as an array, each electrical base contact group implementing an electrical connection with the electrical module contacts; and
   an electronic connection interface operatively connected to said base,
   wherein:
   each control module is provided with releasable coupling means for allowing quick fitting and release of each control module on and off the base;
   the electronic motherboard is configured to bring electrical power to each control module fitted on the base, recognize placement and orientation of each module fitted on the base, and transmit to the electronic connection interface electrical control signals generated by the control modules; and
   the electronic connection interface is configured to convert said electrical control signals into electrical output signals compatible with the device, process or application to control.

2. The control device of claim 1, wherein at least one control module is provided with a light and/or sound signaling means, and wherein the electronic connection interface is configured to transmit to said control module an input signal for modifying the status of light and/or sound signaling means in response to receipt of an electrical control signal transmitted by said control module.

3. The control device of claim 1, wherein the control modules have a square plan, and wherein each electrical base contact group is repeated four times offset by 90° in order to allow fitting of each control module on the base according to any one of four orientations offset by 90°.

4. The control device of claim 1, wherein each electrical base contact group and the corresponding electrical module contacts comprise at least one power supply contact, one identification contact for a module identification signal and a bus contact for a main bus for transmission of electrical signals to and from the control module.

5. The control device of claim 1, wherein each control module comprises a power supply circuit for enabling power supply of the control module only when the module is fitted on the base, said power supply circuit being for detecting the signal current applied between a module identification pin and earth.

6. The control device of claim 1, wherein the electronic motherboard is configured to:
   apply, in succession, an identification signal to each conductive line of a plurality of conductive lines arranged in rows and columns between the groups of the array of electrical base contacts;
   after each application of said identification signal, send a global addressing message to be processed by all control modules fitted onto the base, said global addressing message containing identification information of a conductive line to which the identification signal has been applied, wherein each control module is configured to store said identification information of the conductive line when receiving said identification signal, and wherein the electronic motherboard is configured to send a query signal to each group of electrical base contacts and to receive from each control module fitted on the base, in response to said query signal, the conductive line identification information previously stored by the control module.

7. The control device of claim 1, wherein the electronic connection interface comprises an interface memory wherein all different control functions associated with respective different control modules are stored, and wherein each control module comprises a module memory where a "module type" constant is stored that identifies the module control function and that is sent to the electronic connection interface after identifying position of the modules so that the electronic connection interface creates an association between the control functions and the control module positions.

8. The control device of claim 7, wherein said module memory also contains an identification constant value which is sent to the electronic connection interface after identifying the position of the modules, the electronic connection interface for communicating with the module using said identification constant value regardless of the position of the control module.

9. The control device of claim 7, wherein said module memory, or a base memory, also contains an "Event-Messages" parameter that identifies data of the electrical output signals to be sent after an event associated with a module.

10. The control device of claim 7, wherein the module memory, or a base memory, also contains an "Event-Macro" parameter that is transmitted to the electronic connection interface after identification of the position of the control module, and which identifies a sequence of control functions or a combination of control functions associated with pre-defined sequences/processing and pre-loaded in the electronic connection interface that are executed after a module event.

11. The control device of claim 1, wherein the control modules are selected from a group consisting of:
- a "button", for generating a control signal as a function of its pressed/released state, of the pressure movement speed and of the value of the pressure exerted;
- a "potentiometer", for generating a control signal as a function of the angular position of a pin;
- a "fader", for generating a control signal as a function of the linear position of a cursor;
- an "encoder", for generating a control signal as a function of the angular position thereof and of rotation direction;
- a "display", comprising a display of information received from the electronic connection interface through the electronic motherboard;
- a "joystick", comprising a control means and a transducer for converting position of the control means in a position information with respect to the Cartesian axes;
- a "JogWheel", comprising a control disc and a transducer for converting the angular position of said control disc into an electrical control signal;
- a "Track bar", comprising a transducer for detecting position of the user's finger with respect to a surface; and
- a "Wireless" module, for adding wireless connectivity to the control device.

12. The control device of claim 1, wherein the electronic connection interface is removably connected to the electronic motherboard.

13. The control device of claim 1, wherein each control module is provided on opposite sides with at least one pair of elastic coupling arms for engaging snap-wise in corresponding hooking holes made in the electronic motherboard, each of said elastic arms being provided with a hooking tooth for engaging the lower side of the electronic motherboard.

14. The control device of claim 13, comprising a pair of extractors which can be inserted into said hooking holes to cause a disengagement of the hooking tooth from the electronic motherboard.

15. The control device of claim 1, further comprising hardware and software configuration means operatively connectable to the electronic connection interface, comprising a user interface and configured to display on said user interface a reproduction of the base in which the modules fitted on the base, their position, their orientation, and their state are displayed.

16. The control device of claim 15, wherein said hardware and software means are configured to assign and/or modify a control function associated with a position of a control module on the base.

17. The control device of claim 15, wherein said hardware and software means are configured to execute a module setting which comprises at least one setting of the following module features: properties, parameters assigned to events, macros assigned to properties, methods, and events.

* * * * *